March 14, 1950 J. W. KENT 2,500,287
DIAL SPEED TESTER WITH TONE INDICATION
Filed Nov. 14, 1945
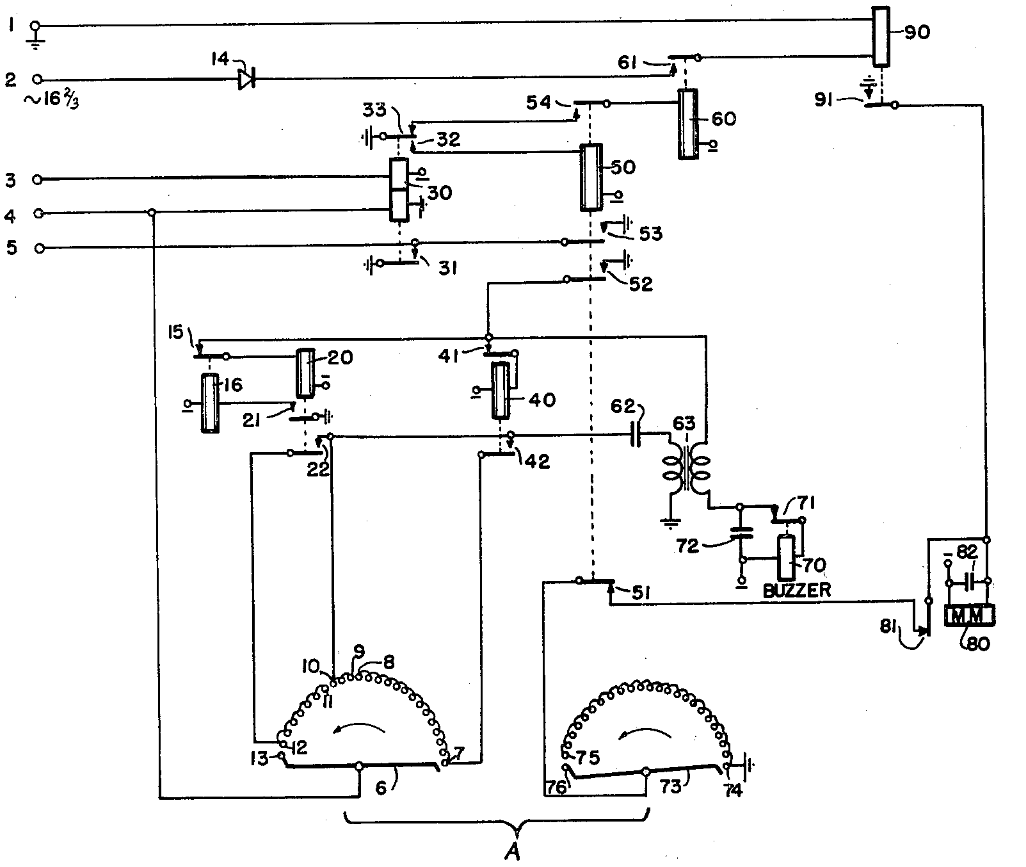
INVENTOR.
JOSEPH W. KENT
BY Chas. W. Candy
ATTORNEY Patented Mar. 14, 1950 2,500,287

UNITED STATES PATENT OFFICE 2,500,287

DIAL SPEED TESTER WITH TONE INDICATION

Joseph W. Kent, Turtle Creek, Pa., assignor to Automatic Electric Laboratories, Inc., Chicago, Ill., a corporation of Delaware Application November 14, 1945, Serial No. 628,557

8 Claims. (Cl. 179—175.2)

The present invention relates to testing arrangements for checking the speed or rate per second of impulse sending devices of the type used in automatic telephone systems and other systems and more particularly impulse senders commonly known as dials or calling devices included in telephone subscribers' station equipment by which a subscriber is able to control the automatic switches in the central office for establishing connections with other subscribers and with manual switchboards through which other services may be obtained such as long distance connections.

It is easily understood that the automatic switches which are designed to respond to the impulses from the dials of many subscribers will function correctly only when impulses are received at a rate which is between certain well-known maximum and minimum numbers of impulses per second. This invention provides a simple and accurate means for determining whether the impulse speed of the dial under test is normal, above normal, that is, too fast for satisfactory operation or below normal, too slow. The invention includes an arrangement whereby a dial may be tested without being removed from the telephone instrument or dismantling any other apparatus and without the assistance of anyone at the telephone exchange.

According to one feature of the invention the dial or impulse sender to be tested controls the operation of a relay, whereby the relay closes a circuit to set in motion a rotary switch of the well-known type.

Another feature of this invention is the employment, for timing purposes, of a constant alternating current source such as is commonly used in telephone central offices, for instance, a sixteen and two-thirds cycle per second ringing current, which may be produced by a motor generator set, a dynamotor or a vibrating ringing machine.

Another feature of this invention is the connecting together of the bank contacts on one level of the rotary switch, in three groups, so that the buzzing sound or tone which indicates normal speed will be transmitted to the calling line from the center one of said groups and the buzzing tones to indicate too high or too low a speed will be transmitted from a group of contacts on either side of the center group respectively.

Another feature of this invention is the flexible method of arranging the groups of bank contacts of the rotary switch so that the middle group, which will transmit a tone to indicate a normal speed, may be varied in relation to the starting point of the wiper, so that the device can function as a dial speed testing device for the dials of an automatic telephone system wherein the normal speed is usually ten per second or for groups of impulses which are used for other purposes wherein the normal speed is at some rate other than ten per second.

In this invention, such common apparatus as normally operating relays, slow releasing relays, and a rotary switch having wipers and a plurality of contacts, a buzzer and several condensers are combined into a circuit for indicating the impulse speed of an automatic telephone dial or groups of impulses produced by apparatus other than dials.

An inspector of sub-station telephone equipment can, by calling a special number from any telephone instrument, connect the dial to be tested with the dial speed tester of this invention which is located in the central office. After which he would dial the digit "0" which would cause ten impulses to be sent into the apparatus of this invention. The inspector would then listen to the tone produced by this apparatus to determine one of three conditions, an uninterrupted buzzing tone would indicate that the dial which had been used to send the ten impulses was operating at a normal speed. Should this buzzing sound be interrupted at a frequency of approximately two per second, it would indicate that the dial speed was below normal and, a buzzing sound interrupted at a frequency of approximately four per second would indicate the dial speed to be higher than normal.

The features of this invention will be easily understood from a perusal of the illustration consisting of one figure on one sheet, together with the following brief description.

In the circuit, Fig. 1, 1 and 2 are the terminals of a sixteen and two-thirds cycle per second alternating current, which for all practical purposes can be considered as constant. From terminal 1 this current is connected to one terminal of relay 90. Terminal 2 is connected through rectifier 14 to a contact spring on relay 60, and when contact 61 is closed by the operation of relay 60, current from the alternating current source will operate relay 90. The effect of introducing rectifier 14 into the alternating current circuit to relay 90 is to prevent every other half cycle from reaching relay 90 and therefore the relay receives an intermittent current which is always in the same direction, and as these impulses are at a speed of sixteen and two-thirds per second, relay 90 will open and close its contact 91 at a rate of sixteen and two-thirds impulses per second. Contact 91 of relay 90 will therefore repeat these impulses from ground, contact 91, winding of magnet 80 to battery. Motor magnet 80 of the rotary switch A responds to these impulses causing the two wipers 6 and 73 to be moved over their respective levels of contacts, one contact for each impulse of current. This means that the number of contacts over which the wipers are passing will depend upon the period of time during which contact 61 on relay 60 is closed. It is obvious that a dial under test which is operating at a speed higher than normal will deliver the ten impulses in less time than a dial which is running at a speed below normal. This difference in time is taken advantage of and the circuit is so arranged as to give different tones, depending upon the position of the rotary switch wiper 6 at the moment the dial impulses cease and the intermittent current has been disconnected from relay 90, causing the wipers to come to rest.

The inspector at the premises where the dial is to be tested, removes the telephone receiver and dials a prearranged number which connects the line over which he is calling and the dial to be tested, to terminals 3 and 4 of this invention, one conductor of the calling line will be connected through one winding of relay 30 to battery and the other conductor will be connected through the second winding of relay 30 to ground. Relay 30 operates to close contacts 31 and 32, and to open contact 33. Ground through contact 32 completes a circuit through the winding of relay 50 to battery, operating relay 50. Contact 54 of relay 50 prepares part of the circuit for the operation of relay 60. The armature of relay 30 will follow the impulses from the dial and these impulses are relayed to relays 50 and 60, and as both of these relays are slow releasing, both remain in operated position for the duration of the impulse period, be it of short or long duration. During the impulsing period, the impulses from the alternating current source, through rectifier 14 had been operating relay 90 which in turn controls current to the motor magnet 80 of the rotary switch A and, when these impulses cease, the wipers come to rest on one of the above mentioned three sections of the rotary switch bank. The section between 7 and 8 would be the section in which the wiper 6 would stop if the dial speed was too fast. When the wiper 6 of the rotary switch A comes to rest on any one of the switch points from 7 to 8 inclusive the calling party will hear an intermittent buzz indicating a dial speed above normal. Should the period of time during which the stepping magnet 80 is stepping the wipers 6 and 73 over the bank contacts of their respective levels, be sufficient to allow the wiper 6 to reach one of the bank contacts in the group 9 to 10 inclusive however, the same tone will be heard, but it will be a continuous tone instead of an interrupted tone, indicating normal speed. Likewise should wiper 6 reach one of the contacts in the group from 11 to 12 inclusive, the same tone will be heard but in this event it will again be an interrupted tone, with a slower interruption of the tone signifying that the dial speed is below normal.

When the inspector dials the pre-arranged number representing the circuit of this invention, his calling line is connected through several stages of automatic switches to terminals 3, 4 and 5. Terminal 3 is supplied with battery through one winding of relay 30 and terminal 4 is connected with ground (positive battery) through the second winding of relay 30. Relay 30 operates, closing contacts 31 and 32 and opening contact 33. Contact 31 places ground on terminal 5 connected to the control conductor of the incoming circuit, (not shown). Contact 32 furnishes ground to operate relay 50. The operation of relay 50 closes contact 54 which is a part of the circuit to relay 60. Relay 50 also furnishes ground through contact 53 to terminal 5, which is a multiple of the ground furnished by contact 31 on relay 30 and serves the purpose of holding a guarding ground on the control conductor a short time after the calling party has hung up his receiver, to assure proper functioning of the relays of all switches involved in the connection. Another contact 52 is closed by relay 50 to furnish ground through one winding of the transformer 63 to buzzer 70, to start the buzzer which produces the tone. Also contact 52 supplies ground to the winding of relay 40 through its own contact 41. Relay 40 operates and at contact 41 opens its own circuit causing the armature to return to normal. Upon returning to normal, contact 41 is again closed which completes the circuit to cause relay 40 to again operate. This cycle of operation will continue during the period of time in which the calling line is connected to the terminals 3 and 4. The operation of this relay 40 therefore furnishes the intermittent tone to the group of bank terminals from 7 to 8 inclusive. Further, the same ground from contact 52 on relay 50, through contact 15 on relay 16, operates relay 20. Relay 20 in turn, through its contact 21 operates relay 16, relay 16 at its contact 15 opens the circuit to relay 20. The armature of relay 20 falls back to open the circuit to relay 16, the armature of relay 16 falls back to reclose, through its contact 15, the circuit of relay 20. These relays 16 and 20 therefore will continue to alternately operate and release, while contact 52 on relay 50 remains closed. This alternate operating and release of relays 16 and 20 has the effect of providing to the group of terminals 11 to 12 inclusive, on the level accessible by wiper 6 of the rotary switch bank, an interrupted tone with interruptions half as frequent as the interruptions to the group of bank contacts from 7 to 8 inclusive.

It will be seen from the above explanation that when the line to this circuit is seized, the buzzer starts and furnishes through the secondary winding of transformer 63 and condenser 62, a continuous buzzing tone to a group of contacts 9 to 10 inclusive on the first level of the rotary switch bank, a slow interrupted buzzing tone to contacts 11 to 12 inclusive and an interrupted buzzing tone to contacts 7 to 8 inclusive, of double the speed of the interruption on contacts 11 to 12 inclusive, and in this manner the calling party can receive a buzzing tone to indicate any one of three conditions.

It should be noted that during the time that rotary switch wiper 6 is being rotated over the bank contacts of the first level of the rotary switch, another wiper 73 is also being rotated over the second level of contacts, always resting on the correspondingly numbered bank contact as wiper 6. All contacts from 74 to 75 on this second level are multipled together and connected to ground. Therefore regardless of where wiper 73 comes to rest, ground will be furnished through wiper 73 to a contact on relay 50 and when relay 50 is released, by the opening of the line circuit at the premises where the test is being made, ground will be connected to the winding of motor magnet 80 through its own contact 81, causing the rotary magnet to step the wipers in the same direction around the bank levels until they are returned to their "home" position.

As previously stated, the nature of the buzzing sound heard by the calling party will indicate that the dial speed is normal or whether it is too fast, above normal, or too slow. If the indicated speed is either too slow or too fast the inspector would restore his receiver, releasing the apparatus of this invention and the wipers of the rotary switch would be automatically rotated back to normal, or "home" position and the device is then ready to receive a second call. The inspector after changing the adjustment of the dial can immediately make another call into this device to again check the speed of the dial under test.

The buzzing sound or tone is produced by a buzzer in connection with the primary winding of the transformer and a condenser. The induced buzzing tone is taken from the secondary winding of the transformer and is connected to the calling line through another condenser.

It will be noted that the wiring of the first level of the rotary switch bank is arranged in three groups, designated 7 to 8, 9 to 10, and 11 to 12. These can be arranged in several different ways for the purpose of arranging the middle group in a position on the bank level, which the wiper will reach in the period of time required for the dial or impulse sender under test, to deliver its predetermined normal number of impulses per second. When this point on the bank level has been determined, this bank contact as well as one or two on either side, to allow for the necessary tolerance are multipled together and the uninterrupted buzzing tone is connected thereto. An impulse sender, when connected to terminals 3 and 4 and operating at normal speed will, through the operation of the armature on relay 30, cause relay 60 to keep contact 61 closed a sufficient length of time for relay 90, which is operated by a constant rectified alternating current, to step the wipers of the rotary switch from the "home" position to one of the bank contacts in the group 9 to 10 inclusive. Having determined the bank point which is to represent the normal position and having multipled thereto the required number of contacts on either side, it is only necessary to multiple the remaining contacts in the section 7 to 8, which is to be designated as "too fast," and multiple the remaining bank contacts in the section 11 to 12 and designate this section as "too slow." The last contact on this first level is unwired to provide a "home" or resting point for one end of the wiper when the device is not in use.

Although I have shown and described one embodiment of my invention which includes the use of sixteen and two-thirds cycle per second alternating current, it is to be understood that alternating current of other frequencies may be used. This is possible because the contacts to be joined together and connected to the normal tone are determined by the point on the bank where the wiper comes to rest after a normal series of impulses are received regardless of the frequency used.

What is claimed is:

1. In an impulse speed testing device, an impulse sender to be tested, an intermittent current derived from a constant alternating current source during operation of said sender, a first relay intermittently operated responsive to said intermittent current, a rotary switch having a wiper and bank contacts accessible thereto, means controlled responsive to the operation of said first relay for operating said switch to rotate said wiper over said bank contacts, a tone source, means for connecting different signals from said tone source to said bank contacts, each different signal corresponding to a different speed of said sender, means controlled in response to the transmission of a series of impulses from the impulse sender under test and in accordance with the time required to transmit such series of impulses from the impulse sender under test for determining the stopping position of said wiper on said bank contacts, and circuit means including said wiper for indicating the speed of said impulses by the nature of the one of said signals connected to the bank contact engaged by said wiper in said determining position.

2. In a device for testing the speed of impulses, an impulse sender to be tested, a tone source, an intermittent current derived from a constant alternating current source, a rotary switch with a wiper and bank contacts, means for deriving different signals from said tone source means for connecting said different signals to said contacts, means controlled by said intermittent current for operating said switch to rotate said wiper over said contacts during operation of said sender after which said wiper comes to rest on one of said bank contacts, circuit means including said wiper and said one bank contact for connecting with one of said signals to indicate the speed of said impulse sender under test.

3. In a dial speed testing device, a line having an impulse sender thereon to be tested, a rotary step-by-step switch having a wiper and associated bank contacts accessible thereto, a constant alternating current source, a switch pulsing relay, means responsive to the operation of said sender for operatively connecting said source to said relay for the duration of the operate time of said sender to intermittently operate said relay from said source, means controlled by the intermittent operation of said relay for operating said wiper step-by-step to a bank contact corresponding to the number of intermittent operations of said relay, and means for indicating the speed of said sender in accordance with the number of steps taken by said wiper.

4. In a dial speed testing device, a line having an impulse sender thereon to be tested, a rotary step-by-step switch having a wiper and associated bank contacts accessible thereto, a constant alternating current source, means responsive to the operation of said sender for impulsing said switch under control of said source to step the wiper of said switch over a number of said contacts dependent upon the operate time of said sender, and means for indicating the speed of said sender in accordance with the number of steps taken by said wiper.

5. In a dial speed testing device, a constant alternating current source, a line, an impulse sender on said line to be tested, a rotary step-by-step switch having a wiper and associated bank contacts accessible thereto, said bank contacts being divided into a plurality of groups and the contacts in each group being multipled, means responsive to the operation of said sender for impulsing said switch under the control of said source to step the wipers of said switch over said contacts a number of steps dependant upon the operate time of said sender, a tone source, means for generating a plurality of different signals from said tone source, circuit means connecting said different signals to different groups of said bank contacts, and means for connecting one of said signals to said line dependant upon the particular group of bank contacts engaged by said wiper to indicate the speed of said sender.

6. In a device for testing the speed of impulses, a line with an impulse sender to be tested, a first relay operated when said device is seized by said line, a second relay operated by said first relay, a third and fourth relay operated by said second relay, a fifth relay operated by said fourth relay, a tone source, means controlled by said third relay for intermittently operating itself under control of said second relay, means controlled by said fifth relay upon operating for intermittently removing said fourth relay from control of said second relay, a rotary step-by-step switch having a wiper and associated bank contacts accessible thereto, said bank contacts arranged in three groups with all contacts in each group multipled, said tone source connected to the center group of multiple bank contacts to provide a signal to be known as normal, make contacts on said third relay for connecting said tone to the second group of said multipled contacts to cause periodic interruptions of said tone whenever said third relay intermittently operates to provide a signal to be known as too fast, make contacts on said fourth relay for connecting said tone source to the said third group of bank contacts to cause different periodic interruptions of said tone to provide a third signal known as too slow, and means responsive to a party on said line dialling the digit 0 on said sender for operating said wiper during the time said sender is transmitting the digit 0 to any one of said groups of multipled bank contacts dependent upon the operate speed of said sender to thereby receive the tone signal connected to such group of multipled contacts engaged by said wiper.

7. In a dial speed testing device, a line having an impulse sender to be tested, a rotary step-by-step switch having a wiper and associated bank contacts accessible thereto, said bank contacts divided into three groups and all contacts in each group multipled, said wiper connected to one side of said line, a tone signal connected to one said group of bank contacts, means for interrupting said tone signal a predetermined number of times per second and connecting said interrupted tone signal to another group of said bank contacts, a second means for interrupting said tone source at a greater number of interruptions per second and connecting this said interrupted tone signal to said third group of bank contacts, means responsive to the operation of said sender for rotating said wiper during the operate time of said sender to connect said any one side of said line to one of said groups of bank contacts dependent upon the speed of said sender, and circuit means for transmitting one of said tone signals over said wiper to said line to indicate the relative speed of said sender.

8. In a device for determining the relative speed of a series of impulses of a dial or impulse sender, a line having a dial to be tested, a rotary stepping switch, a constant alternating current source, said stepping switch having a wiper and associated bank contacts accessible thereto, means for producing a tone signal, a second means for interrupting said tone a given number of times per second to produce a second tone signal, a third means for interrupting said tone at a different rate to produce a third tone signal, means for connecting different ones of said tone signals to different ones of said bank contacts, means controlled by said alternating current responsive to a testing operation of said dial for operating said switch to rotate said wiper a number of steps into engagement with one of said bank contacts dependent upon the operate time of said dial, and circuit means including said wiper and said engaged one bank contact for transmitting one of said tone signals to said line to indicate the relative speed of the impulses produced by said dial.

JOSEPH W. KENT.

REFERENCES CITED

The following references are of record in the file of this patent:

UNITED STATES PATENTS

| Number | Name | Date |
|---|---|---|
| 1,621,480 | Ewing | Mar. 15, 1927 |
| 1,624,422 | Miller | Apr. 12, 1927 |
| 1,784,612 | Priest | Dec. 9, 1930 |